United States Patent Office 2,753,029
Patented July 3, 1956

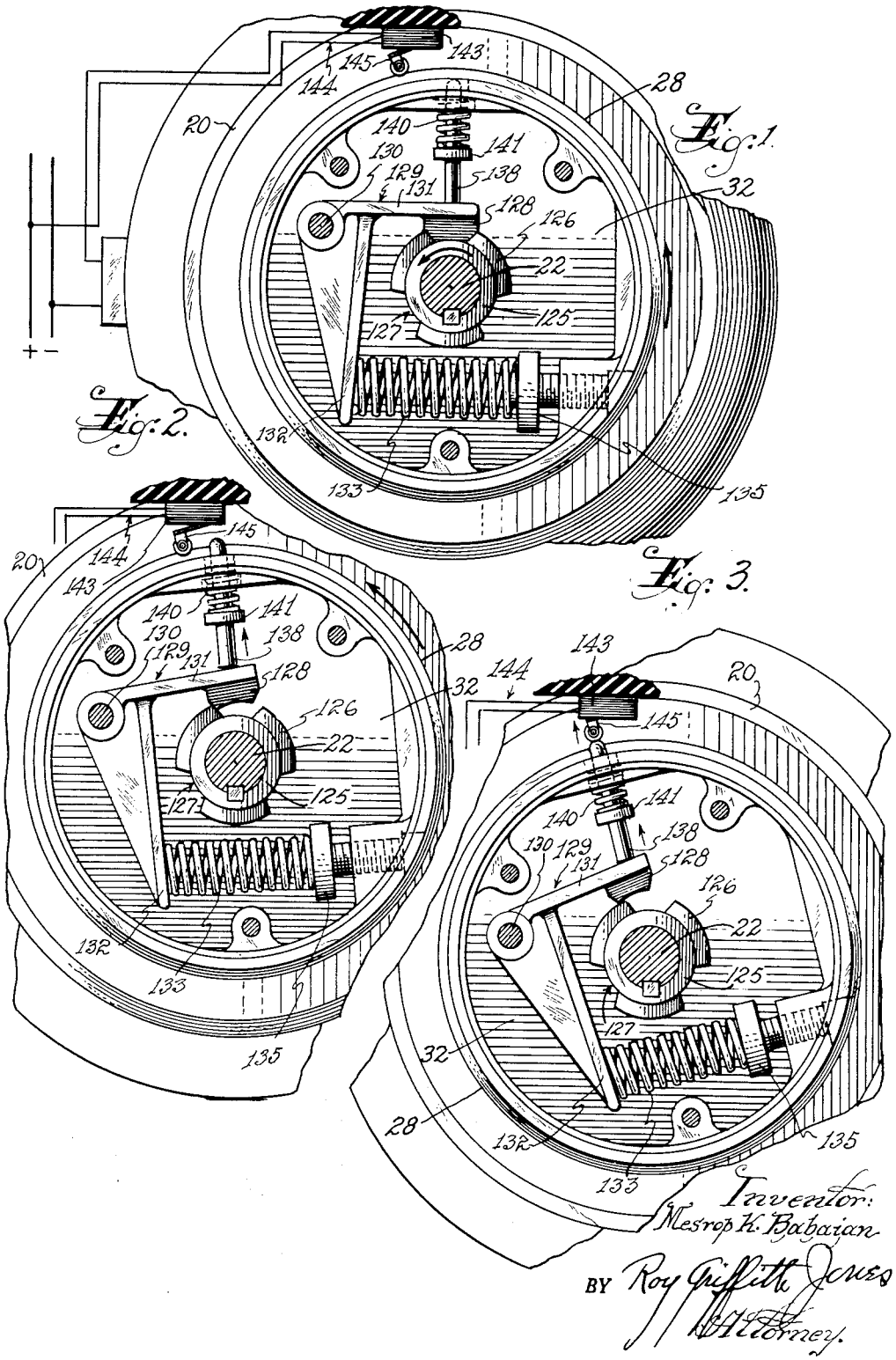

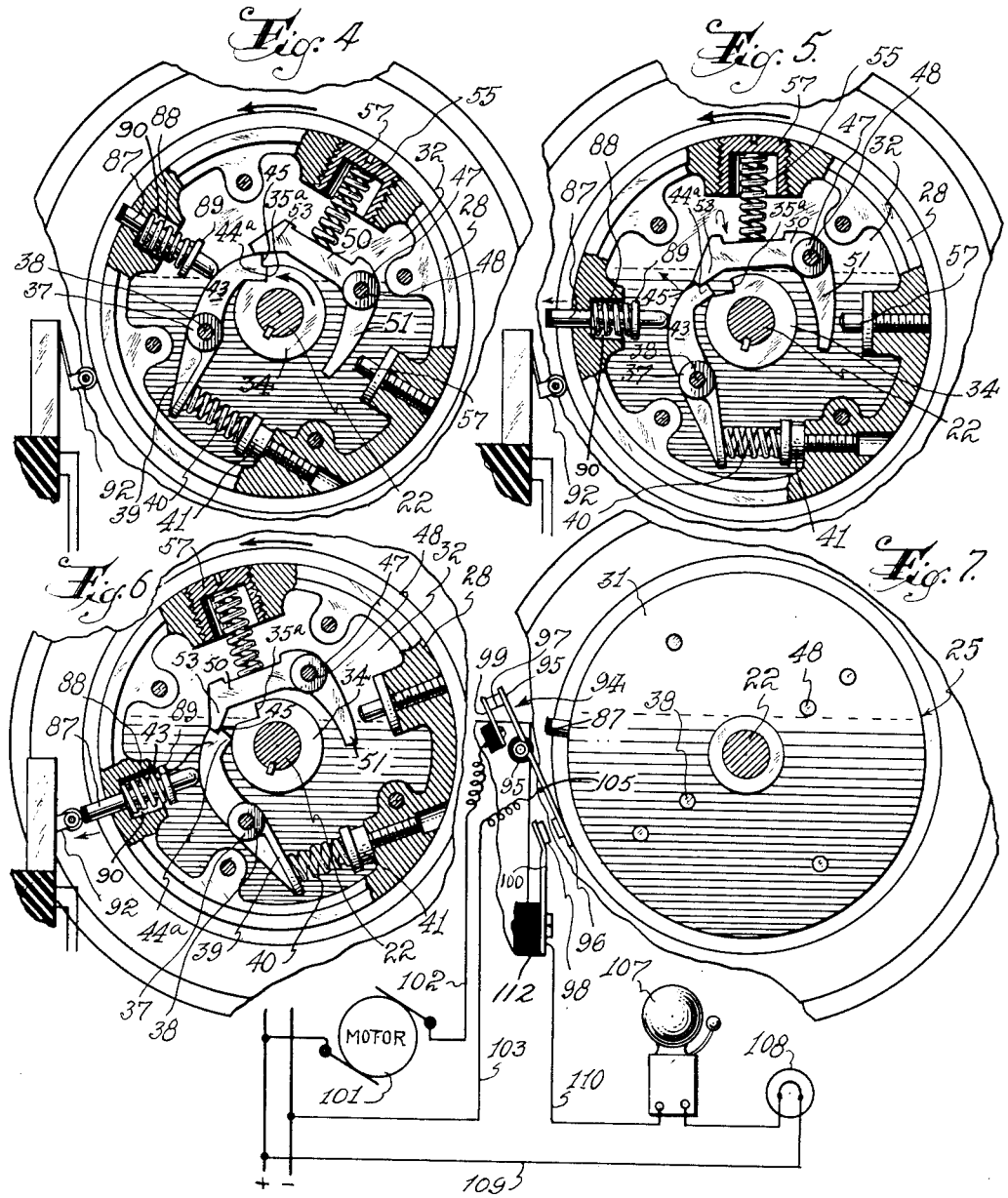

2,753,029

OVERLOAD RELEASE CLUTCH

Mesrop K. Babaian, Irvington, N. J., assignor, by mesne assignments, to Centric Clutch Company, a corporation of New Jersey Original application November 18, 1952, Serial No. 321,147. Divided and this application July 6, 1953, Serial No. 366,234

4 Claims. (Cl. 192—56)

This invention relates to overload release clutches and is a division of my copending application Serial Number 321,147, filed November 18, 1952.

The present invention is directed particularly to clutches having means to signal disengagement of the clutch on overload. Clutches, according to the present invention, in general comprise a collar adapted to be secured on a shaft and having a notch in its periphery, a casing, a pawl pivotally mounted in the casing and having a detent adapted to fit in the notch and slip out of the same on overload, and a pin normally pressed inwardly against the pawl and adapted to be moved outwardly by the latter to a point beyond the periphery of the casing when the pawl is disengaged from the collar notch, thereby signalling disengagement of the clutch.

Clutches according to the invention may be bidirectional, that is they may operate in either direction, or they may be one directional. They may be constructed to automatically reset upon removal of the overload, or they may remain disengaged until positively reset.

These and other features of the invention will be described more fully with reference to the accompanying drawings in which Fig. 1 is a view showing a bidirectional clutch which operates with the shaft running either clockwise or counterclockwise, which automatically signals its disengagement automatically resets itself after an overload has been removed, this view showing the parts in normal position;

Fig. 2 is a view similar to Fig. 1 but shows the position of the parts an instant after the overload occurs;

Fig. 3 is a view showing the position of parts a moment after the condition shown in Fig. 2, the parts now in fully declutched position;

Fig. 4 is a fragmentary view in front elevation of a one directional clutch which signals its disengagement and remains disengaged until positively reset, the clutch being in engaged position and the cover removed;

Fig. 5 is another fragmentary view in front elevation of the clutch of Fig. 4, the clutch here being shown in disengaged position;

Fig. 6 is a fragmentary front elevation view of the clutch of Figs. 4 and 5 showing the signalling means used to open a motor switch.

Fig. 7 is a fragmentary front elevational view of the clutch of Figs. 4 to 6 with the cover on, showing how the signalling means can be used to open a motor circuit and sound an alarm bell.

Referring to Figs. 1–3, this form of clutch comprises a casing having a circular body 28 and side covers one of which is shown at 32. On a shaft 22 is fixedly mounted a collar 125, which has 3 spaced, arcuate segments 126 thereon. The spaces between said segments form notches 127, each of which has oppositely but equally inclined sides, and into any of these notches a correspondingly formed detent 128 is adapted to fit, as shown in Fig. 1, said detent being formed on the free end of a pawl 129.

Said pawl is pivoted on a pin 130 and comprises arms 131 and 132, the former carrying detent 128. Said detent is kept in locking engagement with said collar by the pressure of a compressed coiled spring 133 against the free end portion of said arm 132, which coil at its other end presses against the head of a screw 135 which threadedly engages the casing and is accessible from outside of the casing for turning, in order to adjust the compression of said spring. The clutch is shown driven by an electric motor 20 and has means for automatically shutting off a power source, said means comprising a spring-pressed pin 138 which at its inner end is pressed against arm 131 of the mentioned pawl by a compressed spring 140 coiled around its intermediate portion. The outer end of spring 140 presses against part of the casing, as shown, and its inner end against a collar 141 formed on the pin. When an overload occurs, the pawl is moved against the compression of spring 133, due to detent 128 being forced out of notch 125 on account of the latter's inclined sides. Pawl arm 131 therefore pushes pin 138 outwardly as shown in Figs. 2 and 3. The motor 20 has a power circuit 144 including a snap switch 143, with an outwardly extending arm carrying a roller 145. The roller extends into the path of pin 138 and the switch 143 is snapped to "Off" position when the pin 138 contacts the roller 145. It will be seen from the foregoing description that the clutch of Figs. 1–3 does not require a manual reset after overload, but automatically resets after, and only after, the overload has been removed unless the motor is shut off.

Referring now to Figs. 4–7, the clutch of those figures is similar to that shown in my Patent No. 2,713,406, the application for which patent was copending with this application and was also a division of my application Serial Number 321,147 referred to above. It comprises a casing made up of a circular body 28 and side covers 31 and 32, and a collar 34 keyed to a shaft 22 within the casing 28. An L-shaped notch 35a is formed in the periphery of the collar 34 and a pawl 37 is mounted on a pivot 38, which extends from the side cover 32 of the casing.

Pawl 37 has a lower arm 39 against which presses one end of a compressed coiled load or load resisting spring 40. The spring 40 at its other end presses against a screw 41, which is supported in the casing body 28, and this screw is used to regulate the compression of the spring 40. The pawl 37 has an upper arm 43, the end of which is formed to provide a detent 44a shaped to fit into the notch 35a, and an L-shaped notch 45 above or outside of the detent 44a in notch 35a.

The clutch also comprises a second pawl 47 comprising a first arm 50 and a second arm 51. The first arm is formed at its free end into a detent 53 adapted to fit into the L-shaped notch 45 of the first pawl 37 under overload conditions. A second compressed coiled load or load resisting spring 55 presses against horizontal arm 50 normally to hold the latter against the free end of arm 43 of the first pawl 37. The spring 55 bears against and sets into set screw 57, the latter screw being threaded into an opening in the casing body 28 and serving to regulate the compression of spring 55.

It will be noted that in the embodiment of Figs. 4–7 the L-shaped notch in collar 34 allows the clutch to function when turning in one direction only and, as illustrated, is arranged to turn counterclockwise unless the parts are properly rearranged.

The clutch shown in Figs. 4–7 also includes a resiliently mounted switch operating pin 87. This pin is pressed into contact with the upper arm 43 of pawl 37 by a coiled spring 88 which is wound around the middle section of the pin and bears on a collar 89 formed on the pin, and on the bottom of a recess 90 formed in the casing body 28.

When the shaft 22 turns counterclockwise under normal loads, pawl 37 and its detent 44a fit into notch 45a. The pawl is thus locked to the collar 34 and thereby to the shaft 22 due to pressure of the load springs 40 and 55; and the whole clutch is therefore also locked to the shaft 22. When overload occurs, the detent 44a is forced out of the notch 35a against the pressure of the springs as shown in Figs. 5 and 6. Thereupon, detent 53 of pawl 47 is forced by spring 55 into the L-shaped notch 45 of the first pawl 37 to keep the latter in locked-out position. The outward movement of pawl 37 pushes pin 87 radially outward beyond the casing body 28 as shown in Figs. 5, 6, and 7, signalling disengagement of the clutch.

In the opened position, the pin in rotating with the clutch may be used to open a snap switch 92, as shown in Fig. 6 and thereby shut off the power of a driving source.

Alternatively, the pin 87 may be used simultaneously to open one switch and close another, as illustrated in Fig. 7. In that figure two switches are shown combined in a double-acting snap switch 94, which is pivotally mounted intermediate its ends at 95 and carries contacts 95 and 96 at its ends. Contacts 95 and 96 are respectively positioned to cooperate with contacts 97 and 98 mounted on conductors 99 and 100. A motor 101 is connected to a power line by a circuit which includes wires 102 and 103. Wire 102 is connected to conductor 99 and therefore to contact 97. Wire 103 is connected to the switch at point 105. An alarm circuit includes a bell 107 and a lamp 108 in series, a wire 109 leading from the power line to the lamp, a wire 110 from the bell to a switch box 112 with which support 100 is connected. The return line of the alarm circuit is through wire 103. The operation of the switch is as follows. Switch pin 87, in outwardly projected position and rotating with the clutch as a whole, comes into contact with the lower part of the switch 94 and thereby snaps contactors 95 and 97 apart and contactors 96 and 98 together, the motor circuit being then open and the alarm circuit closed. The power is therefore shut off and the bell and lamp are activated to give notice that there is an overload and that both the power and the load have been disconnected.

When the cause of the overload has been removed, pawl 47 is taken out of notch 45, i. e. reset to its normal position by turning a reset screw 57 which is threaded in the casing body 28 against the second arm 51 of pawl 47. The detent 44a will then fall into notch 35a when the two are brought into contact, as by turning either the shaft or the clutch through part of one revolution.

What is claimed is:

1. An overload release clutch comprising a collar adapted to be secured to a shaft and having a plurality of similar circumferentially spaced notches formed in its periphery, said notches having oppositely inclined sides, a casing, a single pawl pivotally mounted in said casing and having a detent adapted to fit into any of said notches, and to slip out of the same on overload, and a pin normally pressed inwardly against said pawl and adapted to be moved outwardly by the latter to a point beyond the periphery of said casing when said pawl is disengaged from said collar notch thereby signalling disengagement of the clutch.

2. An overload release clutch comprising a collar adapted to be secured to a shaft and having a plurality of similar circumferentially spaced notches formed in its periphery said notches having oppositely inclined sides, a casing, a single pawl having two arms angularly joined at a pivot point, being pivotally mounted in said casing at said pivot point and having a detent on one of said arms adapted to fit into any of said notches and to slip out of the same on overload, and a pin normally pressed inwardly against said pawl and adapted to be moved outwardly by the latter to a point beyond the periphery of said casing when said pawl is disengaged from said collar notch, thereby signalling disengagement of said clutch.

3. An overload release clutch comprising a collar adapted to be secured on a shaft and having a notch in its periphery, a casing, a pawl pivotally mounted in said casing and having a detent adapted to fit said notch and slip out of the same on overload, and a pin normally pressed inwardly against said pawl and adapted to be moved outwardly by the latter to a point beyond the periphery of said casing when said pawl is disengaged from said collar notch, thereby signalling disengagement of said clutch.

4. An overload release clutch comprising a casing, a collar adapted to be secured to a shaft and having a notch formed in its periphery, a first pawl and a second pawl pivotally mounted in said casing, said first pawl having a detent and a notch, said detent being adapted to fit said collar notch and normally disposed therein, but adapted to slip out of said collar notch on overload, a first spring normally holding said first pawl in said collar notch, a second spring normally pressing said second pawl against said first pawl, both of said springs being load springs adapted to resist the tendency of a normal load to remove said detent from said collar notch, said second pawl being pressed by its spring into said notch of said first pawl when the latter is moved out of said collar notch by an overload, thereby preventing said first pawl from reentering said notch until the overload is removed, and a pin normally pressed inwardly against said first pawl and adapted to be moved outwardly by said first pawl to a point beyond the periphery of said casing when said first pawl is disengaged from said collar notch thereby signalling disengagement of said clutch.

References Cited in the file of this patent

UNITED STATES PATENTS

| | | |
|---|---|---|
| 998,615 | Huneke | July 25, 1911 |
| 1,391,601 | Zanon | Sept. 30, 1921 |
| 1,548,427 | Aldeen | Aug. 4, 1925 |
| 1,745,738 | Carter | Feb. 4, 1930 |
| 2,003,115 | Grohn | May 28, 1935 |
| 2,172,834 | Clausen | Sept. 12, 1939 |
| 2,425,736 | Hall | Aug. 19, 1947 |
| 2,580,298 | Hopkins et al. | Dec. 25, 1951 |
| 2,652,527 | Moody et al. | Sept. 15, 1953 |